United States Patent

Rees et al.

[11] Patent Number: 6,078,341
[45] Date of Patent: Jun. 20, 2000

[54] LASER DIODE RASTER OUTPUT SCANNERS WITH INTERLACED SCAN LINES

[75] Inventors: James D. Rees, Pittsford; Edward C. Bock, Macedon, both of N.Y.

[73] Assignee: Xerox Corporation, Stamford, Conn.

[21] Appl. No.: 09/211,235

[22] Filed: Dec. 14, 1998

[51] Int. Cl.$^7$ .................................................. G03G 15/04
[52] U.S. Cl. ........................................... 347/129; 347/233
[58] Field of Search ........................... 347/115–118, 129, 347/233, 234, 235

[56] References Cited

U.S. PATENT DOCUMENTS

| | | | |
|---|---|---|---|
| 5,243,359 | 9/1993 | Fisli | 346/1.1 |
| 5,291,223 | 3/1994 | Ogane et al. | 347/116 |
| 5,323,026 | 6/1994 | Paoli | 257/85 |
| 5,323,381 | 6/1994 | Takahashi et al. | 369/282 |
| 5,343,224 | 8/1994 | Paoli | 346/108 |
| 5,589,870 | 12/1996 | Curry et al. | 347/233 |

*Primary Examiner*—Joan Pendegrass
*Attorney, Agent, or Firm*—John M Kelly

[57] ABSTRACT

A raster output scanner assembly having a first laser source for producing first and second laser beams, and a second laser source for producing third a fourth laser beams. The first and second laser beams are directed to a first rotating, multifaceted polygon while the third and fourth laser beams are directed to a second rotating, multifaceted polygon. The first polygon reflects the first and second laser beams onto a moving photoreceptor while the second polygon reflects the third and fourth laser beams onto the photoreceptor. The spots produced by the various laser beams are interlaced such that the scan line produced by the third laser beam is between the scan lines produced by the first and second laser beams, while the scan line produced by the fourth laser beam is adjacent the scan line produced by the second laser beam.

5 Claims, 2 Drawing Sheets

LASER DIODE RASTER OUTPUT SCANNERS WITH INTERLACED SCAN LINES

FIELD OF THE INVENTION

This invention relates to electrophotographic marking machines. More particularly, it relates to a marking machine that has a plurality of multiple laser beam raster output scanners in which the beams form interlaced scan lines.

BACKGROUND OF THE INVENTION

Electrophotographic marking is a well known and commonly used method of copying or printing documents. Electrophotographic marking is performed by exposing a substantially uniformly charged photoreceptor with a light image representation of a desired document. In response to that light image the photoreceptor discharges so as to create an electrostatic latent image of the desired document on the photoreceptor's surface. Toner particles are then deposited onto that latent image to form a toner image. That toner image is then transferred from the photoreceptor onto a copy substrate, such as a sheet of paper. The transferred toner image is then fused to the copy substrate, usually using heat and/or pressure. The surface of the photoreceptor is then cleaned of residual developing material and recharged in preparation for the production of another image.

One method of exposing the photoreceptor is to use a Raster Output Scanner (ROS). A ROS is typically comprised of a laser light source (or sources) and a rotating polygon having a plurality of mirrored facets. The light source radiates a laser beam onto the polygon facets. The facets reflect the beam onto the photoreceptor, producing a light spot. As the polygon rotates the spot traces lines, referred to as scan lines, on the photoreceptor. By moving the photoreceptor in a process direction as the spot traces scan lines in the fast scan direction, the surface of the photoreceptor is raster scanned by the spot. During scanning, the laser beam is modulated with image information so as to produce a predetermined latent image on the photoreceptor.

While raster output scanners have been very successful, when printing at very high speeds significant problems must be overcome. For example, consider an electrophotographic marking machine printing at 120 pages per minute. This requires printing about 22 inches of paper per second. For various reasons (cost, noise, reliability) it is desirable that the polygon rotation should be limited to around 20,000 revolutions per minute or less. A dual laser diode ROS, which produces two scan lines at 600 Spots per inch at a time, having a 20 facet polygon rotating at about 19,800 revolutions per minute would meet the printing speed requirements. Unfortunately, such a ROS has problems. First, because of its large number of facets the ROS itself would be very large and would have a relatively long scan lens focal length. These characteristics are not compatible with compact, small footprint (desktop) printers. Additionally, such a large, multifaceted polygon would be rather expensive.

Therefore, a new raster output scanner assembly that is capable of printing at very high speeds and that is compatible with compact printers would be beneficial. Even more beneficial would be a new raster output scanner assembly that is capable of printing at very high speeds and that is suitable for use in a low cost, compact printer.

SUMMARY OF INVENTION

The principles of the present invention provided for a new raster output scanner assembly, and printers that use raster output scanners, that is capable of printing at very high speeds and that is compatible with compact printers. A raster output scanner assembly in accordance with the principles of the present invention includes a first dual laser source for producing a first laser beam and a second laser beam, and a second dual laser source for producing a third laser beam and a fourth laser beam. The first and second laser beams are directed to a first rotating polygon having a plurality of reflective facets while the third and fourth laser beams are directed to a second rotating polygon having a plurality of reflective facets. The first polygon reflects the first and second laser beams onto a moving photoreceptor while the second polygon reflects the third and fourth laser beams onto the photoreceptor. The spots produced by the various laser beams are interlaced such that the scan line produced by the third laser beam is between the scan lines produced by the first and second laser beams, while the scan line produced by the second laser beam is between the scan lines produced by the third and fourth laser beams.

BRIEF DESCRIPTION OF THE DRAWINGS

Other features of the present invention will become apparent as the following description proceeds and upon reference to the drawings, in which.

DETAILED DESCRIPTION OF THE INVENTION

Figure 1:
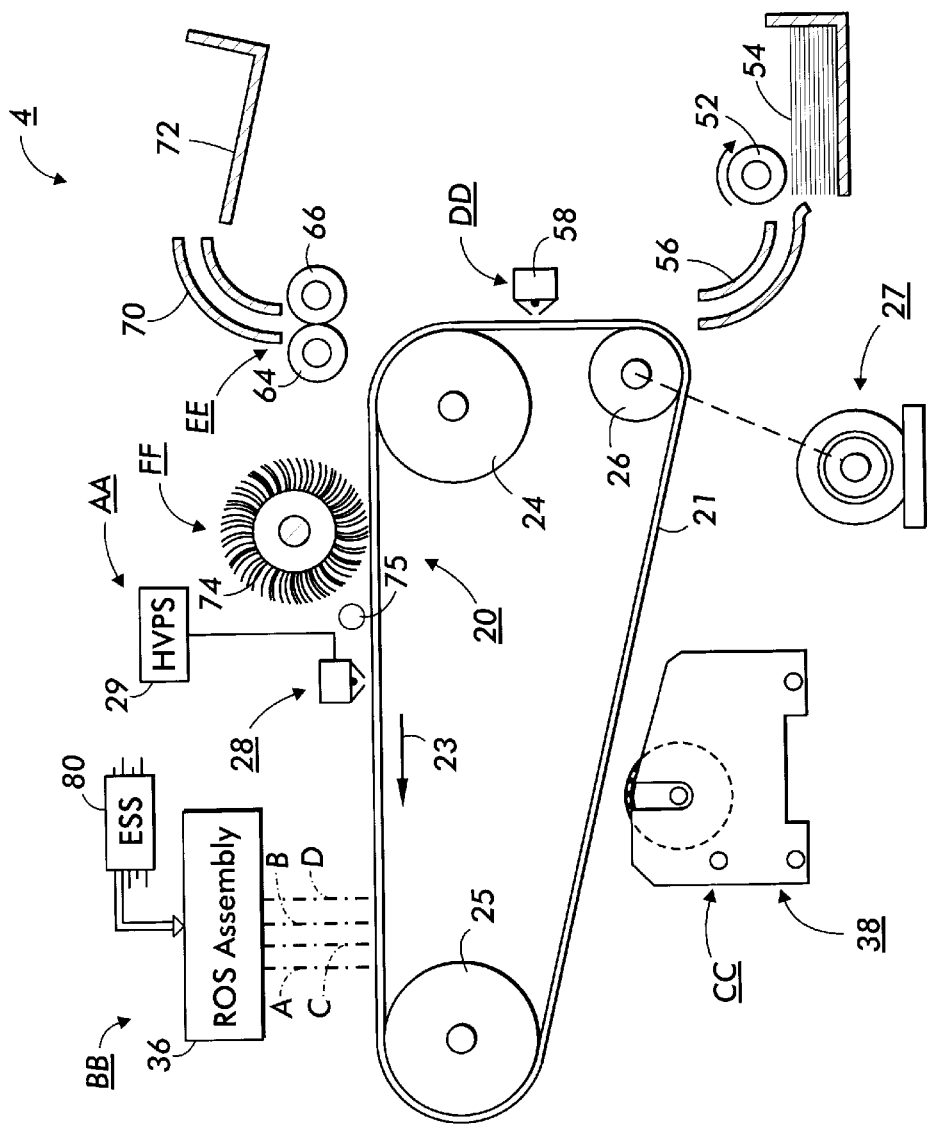
FIG. 1 is a schematic illustration of a printing apparatus according to the principles of the present invention.

While the present invention will be described in connection with a preferred embodiment thereof, it will be understood that it is not intended to limit the invention to that embodiment. On the contrary, it is intended to cover all alternatives, modifications, and equivalents, such as using quad laser diodes, as may be included within the spirit and scope of the invention as defined by the appended claims.

Inasmuch as the art of electrophotographic printing is well known, the various processing stations employed in the electrophotographic printing machine 4 illustrated in FIG. 1 will be shown hereinafter only schematically and their operation described only briefly. The reproduction machine incorporates a photoreceptor 20 in the form of a belt having a photoconductive surface 21. The photoreceptor is driven by a motor 27 along a path defined by rollers 24, 25 and 26, with the direction of movement being counter-clockwise as shown by arrow 23.

Initially, a portion of the photoreceptor 20 passes through a charge station AA at which a corona generator 28 charges the photoconductive surface 21 to a relatively high, substantially uniform, potential. A high voltage power supply 29 supplies the electrical bias for the corona generator 28.

Next, the charged portion of photoconductive surface 21 advances through an exposure station BB. At exposure station BB, a ROS assembly 36 produces four laser beams, the beams A, B, C, and D, that raster scan the photoconductive surface. The laser beams expose the photoconductive surface such that the photoconductive surface is discharged to produce an electrostatic latent image of a desired final image. Since the principles of the present invention directly involve the ROS assembly 36, that assembly is discussed in more detail subsequently.

After the electrostatic latent image has been recorded, the latent image is advances to a development station CC. There a developer 38 develops the latent image on the photoconductive surface with toner.

After the electrostatic latent image has been developed, the photoreceptor 20 continues its rotation and advances the now developed image to a transfer station DD. At the transfer station a roller 52 and guides 56 advance a copy sheet 54 into contact with the developed image. A corona generator 58 sprays ions onto the back of the copy sheet so as to attract the toner image from the photoreceptor onto the sheet. As the photoreceptor continues to advance it changes direction at the roller 24. There, the copy sheet with the toner image separates from the photoreceptor.

The copy sheet then advances via a conveyor (not shown) to a fusing station EE. The fusing station EE includes a heated fuser roller 64 and a back-up roller 66. The copy sheet with its toner image passes through a nip between the fuser roller 64 and the back-up roller 66 such that the toner image contacts the fuser roller 64. Heat and pressure fuses the toner permanently to the copy sheet. After fusing, the copy sheet advances through a chute 70 to a catch tray 72 for subsequent removal by an operator.

After the copy sheet has separated from the photoreceptor, residual toner particles and other debris adhering to the photoconductive surface 21 are removed at a cleaning station FF. The cleaning station uses a rotating fibrous brush 74 that contacts the photoconductive surface 21. After cleaning, a discharge lamp 75 floods the photoconductive surface 21 with light to dissipate any residual electrostatic charge. The photoreceptor then advances to the charging station AA and the beginning of another printing cycle.

The electrophotographic printing machine 4 also includes an electronic subsystem (ESS) 80 that controls the various components and operating subsystems of the machine. In particular, the electronic subsystem 80, which may include a dedicated minicomputer, supplies the ROS assembly 36 with the information that is to be marked. It should be understood that the electrophotographic printing machine also includes various power supplies, sensors, mechanical components, and user interfaces as required to perform the described printing process.

Figure 2:
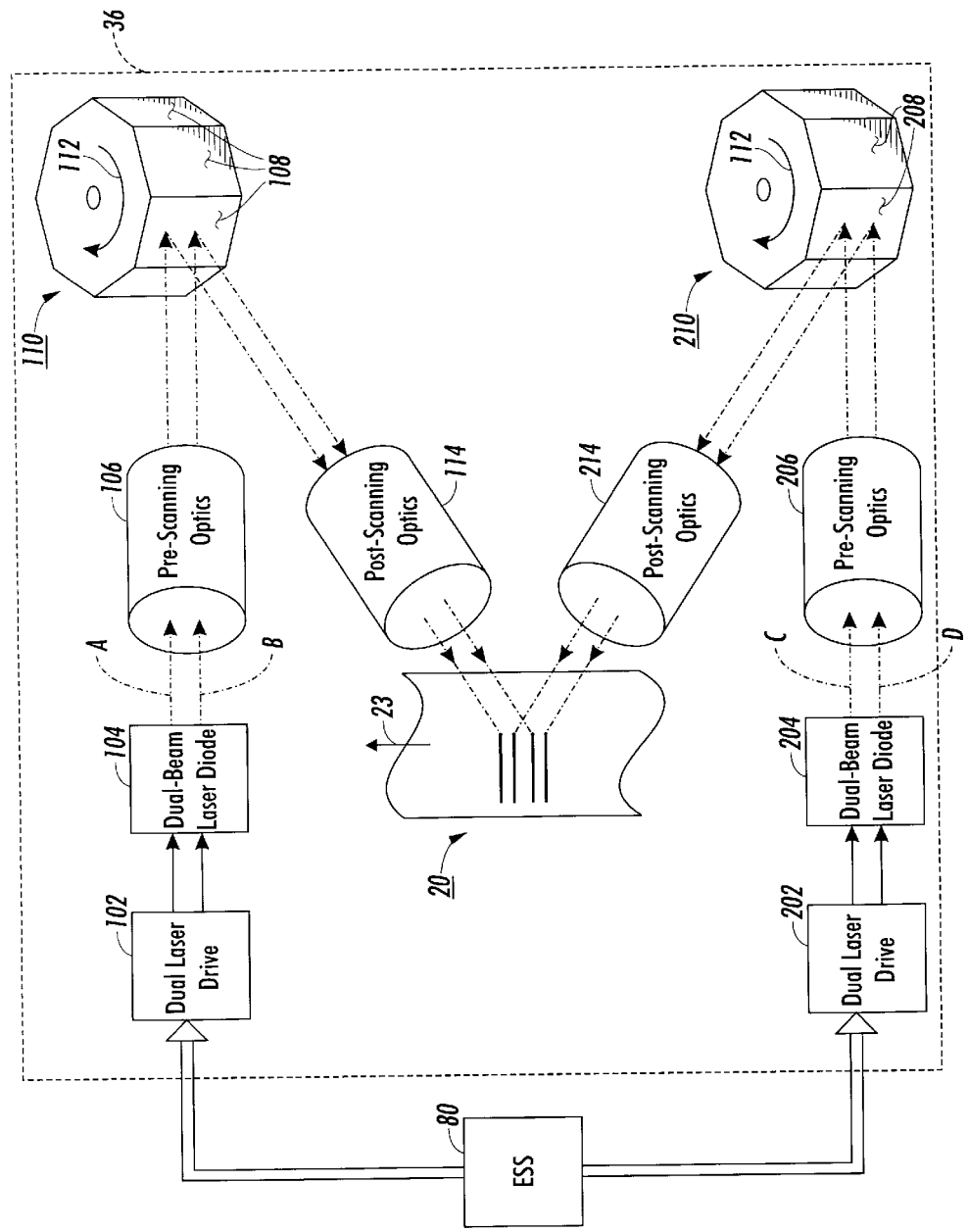
FIG. 2 is a schematic illustration of a raster output assembly having tandem, dual laser diode raster output scanners and which is in accord with the principles of the present invention.

Reference is now made to FIG. 2, which illustrates the raster output scanner assembly 36 and the data output section of the ESS 80 (reference FIG. 1). The raster output scanner assembly 36 is comprised of tandem raster output scanners. One of the raster output scanners includes a dual laser driver 102 that receives video data information from the ESS 80. The laser driver 102 then drives a dual laser diode 104 that outputs two laser beams, the beams A and B, which are modulated according to the video data information. The dual laser diode 104 is beneficially comprised of two abutted laser diode chips that output closely spaced laser beams. Both laser beams pass through a pre-scanning optical system 106 of the type that is commonly used in raster output scanners. The dual laser beams reflect from the facets 108 of a polygon 110 that rotates in the direction 112. The reflected laser beams pass through a post-scanning optical system 114 of the type that is commonly used in raster output scanners. The laser beams A and B then trace scan lines across the photoreceptor 20.

The second raster output scanner is essentially identical to the first. A dual laser driver 202 receives video data information from the ESS 80. That laser driver then drives a dual laser diode 204 that outputs two laser beams, the beams C and D, which are also modulated according to video data information. The dual laser diode 204 is beneficially identical to the dual laser diode 104. The laser beams C and D pass through a pre-scanning optical system 206 and reflect from the facets 208 of a polygon 210 that rotates in the direction 112. The reflected laser beams then pass through a post-scanning optical system 214 and trace scan lines across the photoreceptor 20.

The laser beams A and B (from the first raster output scanner) and the laser beams C and D (from the second raster output scanner) trace closely spaced scan lines. For example, as shown in FIG. 2, the scan line ordering is A, C, B, D. That is, the scan line produced by laser beam A is next to the scan line produced by the laser beam C. The scan line produced by the laser beam C is between the scan lines produced by laser beams A and B. The scan line produced by laser beam B is between the scan lines produced by laser beams C and D. Now, the photoreceptor rotation is such that by the time the four scan lines discussed above are imaged, the photoreceptor 20 has advanced in the direction 23 such that the next scan line produced by laser beam A is adjacent to, and properly spaced from, the scan line previously produced by the laser beam D. As the polygons 110 and 210 continue to rotate in the direction 112, and as the photoreceptor continues to advance in the direction 23, a desired electrostatic image is produced on the photoreceptor 20.

The raster scanner assembly 36 is advantageous in that tandem raster output scanners enable smaller polygons, fewer facets and slower rotational velocities as compared to systems that use only one dual laser diode raster output scanner. While registering multiple laser beams is a problem, various techniques are available for reducing registration problems. For example, by mounting both polygons on the shaft of a single motor speed scan line velocity problems can be reduced or eliminated. Furthermore, by "matching" polygons, that is by either selecting polygons that together result in relatively small registration problems, or by matching the facets from polygon 110 that align with facets from polygon 210, registration errors can be reduced. Finally, while the use of a tandem, dual laser diode raster output scanner assembly in color printing is beneficial, when printing in black and white registration errors between the laser beams is less important.

While the principles of the present invention have been described in conjunction with a specific embodiment, many alternatives, modifications, and variations will be apparent to those skilled in the art. Accordingly, the present invention is intended to embrace all alternatives, modifications and variations that fall within the spirit and scope of the claims.

It is claimed:

1. A raster output scanner assembly for a printing apparatus, comprising:

a first laser source for producing a first laser beam and a second laser beam;

a first rotating polygon having a plurality of reflective facets, said rotating polygon for reflecting said first laser beam and a second laser beam onto a moving photoreceptive surface so as to produce a first scan line and a second scan line;

a second laser source for producing a third laser beam and a fourth laser beam; and a second rotating polygon having a plurality of reflective facets, said rotating polygon for reflecting said third laser beam and said fourth laser beam onto the moving photoreceptive surface so as to produce a third scan line and a fourth scan line;

wherein said third scan line is between said first scan line and said second scan line and wherein said second scan line is between said third scan line and said fourth scan line.

2. The raster output scanner of claim 1, further including a first pre-polygon optical system between said first laser diode and said first rotating polygon.

3. The raster output scanner of claim 1, further including a first post-polygon optical system between said first rotating polygon and said photoreceptive surface.

4. The raster output scanner of claim 1, further including a first laser driver for receiving video information, said first laser driver further for driving said first laser source such that said first laser beam and said second laser beam are modulated in accordance with said video information.

5. A printing machine, comprising:
   a charged photoreceptor moving in a process direction; and
   a raster output scanner assembly having a first laser source for producing a first laser beam and a second laser beam; a first rotating polygon having a plurality of reflective facets, said rotating polygon for reflecting said first laser beam and said second laser beam onto said charged photoreceptor so as to produce a first scan line and a second scan line that are substantially parallel to each other and substantially perpendicular to said process direction; a second laser source for producing a third laser beam and a fourth laser beam; and a second rotating polygon having a plurality of reflective facets, said rotating polygon for reflecting said third laser beam and said fourth laser beam onto said charged photoreceptor so as to produce a third scan line and a fourth scan line that are substantially parallel to each other and that are substantially parallel to said first scan line; wherein said third scan line is between said first scan line and said second scan line and wherein said second scan line is between said third scan line and said fourth scan line.

* * * * *